J. E. AMEND.
PASTEURIZING HOLDING TANK.
APPLICATION FILED SEPT. 6, 1906. RENEWED FEB. 1, 1909.

931,025. Patented Aug. 17, 1909.

Witnesses.
Inventor.
Joseph E. Amend,
By Benedict, Morsell & Caldwell,
Attorneys.

UNITED STATES PATENT OFFICE.

JOSEPH E. AMEND, OF MILWAUKEE, WISCONSIN.

PASTEURIZING HOLDING-TANK.

No. 931,025.  Specification of Letters Patent.  Patented Aug. 17, 1909.

Application filed September 6, 1906, Serial No. 333,571. Renewed February 1, 1909. Serial No. 475,526.

*To all whom it may concern:*

Be it known that I, JOSEPH E. AMEND, residing in Milwaukee, in the county of Milwaukee and State of Wisconsin, have invented new and useful Improvements in Pasteurizing Holding-Tanks, of which the following is a description, reference being had to the accompanying drawings, which are a part of this specification.

This invention has for its object to provide an auxiliary pasteurizing apparatus to be used in conjunction with a pasteurizer for requiring the material discharged from the pasteurizer to remain at a pasteurizing temperature a sufficient length of time to become thoroughly pasteurized before passing to the cooler.

Considerable difficulty is met with in pasteurizing liquids such as milk and cream in large quantities, owing to the limited capacity of pasteurizers and the necessity for passing the liquid in a continuous stream, whereby the length of time to which each part of the liquid is subjected to the pasteurizing temperature is insufficient to accomplish complete pasteurization. The first effect of a pasteurizing temperature upon milk and cream and the like liquids is to destroy useful bacteria, and in order that the harmful or disease bacteria should be destroyed the pasteurizing temperature is required to be maintained for a considerably longer time. By cooling the liquid as soon as it is discharged from the pasteurizer, the pasteurization is checked before the harmful bacteria are affected, and results in depriving the liquid of the beneficial bacteria without destroying the disease germs.

This invention consists of a large vat which is partitioned to provide a sinuous passage for the liquid discharged from the pasteurizer and is of such a capacity as to permit the liquid to remain at a pasteurizing temperature for a sufficient length of time to complete pasteurization before being discharged to the cooler. The passage for the liquid is preferably provided by heated troughs and the transfer from one trough to another is accomplished in such a manner as to avoid separation of the different parts of the liquid, there being agitating means in the troughs to also prevent separation of the parts of the liquid.

With the above and other objects in view the invention consists in the pasteurizing holding tank herein claimed, its parts and combinations of parts and all equivalents.

Figure 1:
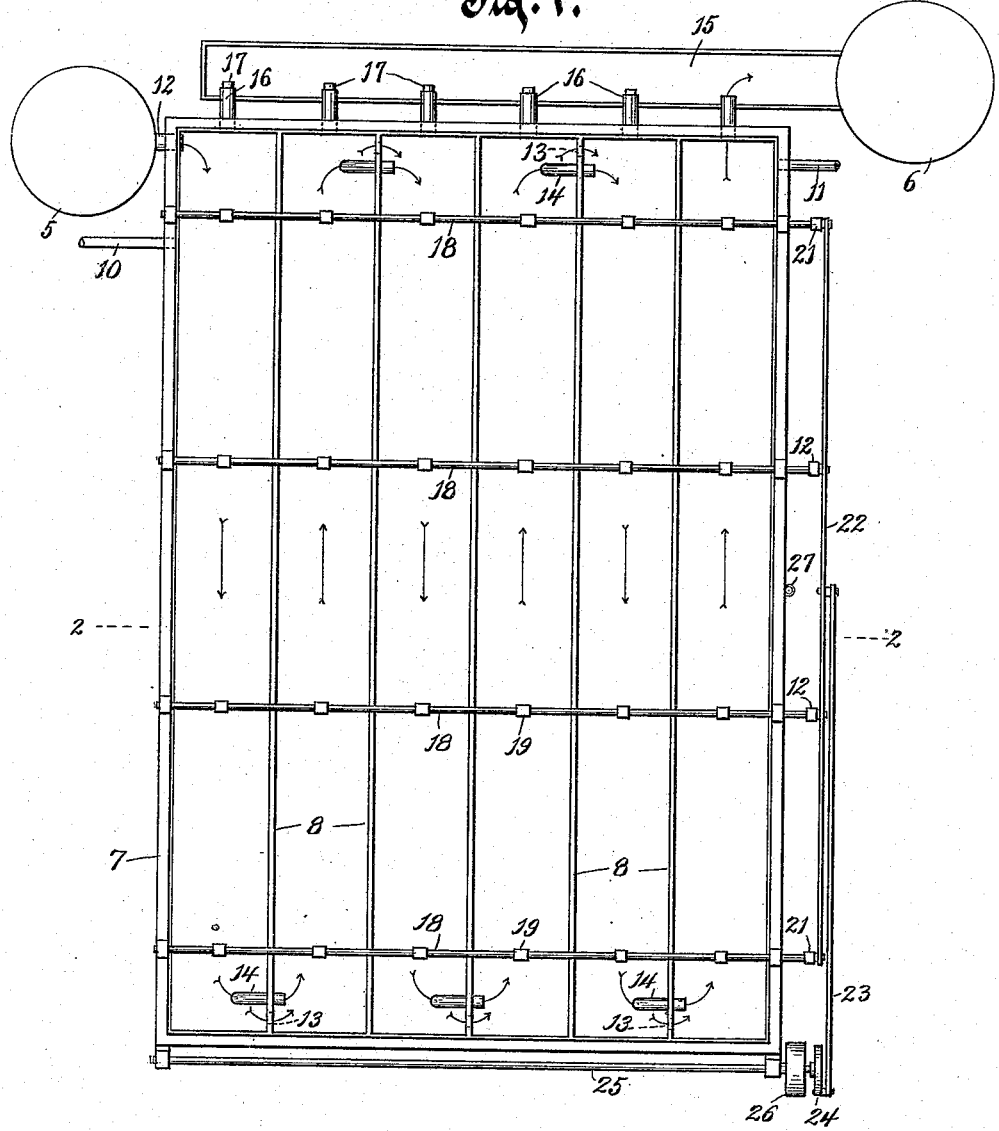
Figure 2:
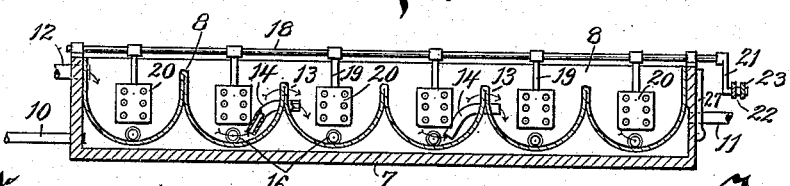

Referring to the accompanying drawings in which like characters of reference indicate the same parts in the several views:—Figure 1 is a plan view of a pasteurizing holding tank constructed in accordance with this invention; and, Fig. 2 is a transverse sectional view thereof taken on the plane of line 2—2 of Fig. 1.

In these drawings 5 represents a pasteurizer of any approved type which is adapted to raise milk or cream or other liquid to a pasteurizing temperature during a continuous flow of the liquid therethrough, and 6 is a cooler of any approved type which is adapted to cool the liquid after the pasteurizing process, the cooler having usually been connected with the pasteurizer direct so that the cooling process was performed immediately on the discharge of the liquid from the pasteurizer.

The pasteurizing holding tank of this invention is interposed between the pasteurizer 5 and the cooler 6 and is preferably arranged and constructed as shown in the drawings and described herein.

A large vat or tank 7 which is desirably of rectangular construction, as shown, is provided with a series of partitions 8 dividing it into a number of longitudinal troughs, the partitions being preferably formed of sheet metal which is bent to form rounded bottoms for the troughs and provide a heating space around the troughs. Steam or hot water is admitted to the space between the sheet metal troughs and the bottom of the vat by a heating pipe 10 on one side of the vat and is discharged from the other side thereof through an outlet pipe 11. On some occasions the heating of the troughs may be dispensed with and the heat of the liquid being pasteurized may be alone relied upon to accomplish the results.

The spout 12 of the pasteurizer 5 discharges into one end of the first trough and at the other end thereof the partition 8 between it and the second trough is provided with a perforation 13 near its upper edge through which the liquid may pass into the second trough when the first trough is nearly full. In addition to this communicating means, there is provided a bent tube 14 which leads from near the bottom of the first trough and passes through the partition slightly lower than the perforation 13 to also carry the liquid from the first trough to the second trough. The object in providing this double means of communication between the troughs is to enable the liquid to be carried from the lower part of the trough as well as from the upper part thereof, and thus if there has been any separation of the parts of the liquid both the heavier and the lighter parts are carried into the next trough instead of the lighter parts only passing and leaving the heavier parts to remain entrapped and accumulating at all times. Aside from the disadvantage which would otherwise result of separating the cream from the casein part of the milk, the openings 13 alone would cause the cream part to pass through the holding tank more quickly than the casein part and thereby probably not be retained at the pasteurizing temperature a sufficient length of time. The provision of means for conveying the liquid from the lower part of the trough as well as from the upper part thereof assures the complete pasteurization of all parts of the liquid and tends to prevent the separation thereof. These communications 13 and 14 are provided for each trough and are at the opposite ends of the adjacent troughs so that the liquid is caused to take a sinuous course, traversing the full length of each of the troughs successively and following the direction of the arrows.

At one end of the tank 7 there is a trough 15 leading to the cooler 6 and each of the troughs of the holding tank has a spout 16 discharging therein, the spouts of all of the troughs except the last one being normally closed by stoppers 17 or by other means. The object in providing the spouts 16 for all of the troughs is to enable the entire holding tank to be drained at the close of the pasteurizing operation for the day, this being accomplished by removing the stoppers 17.

When it is desired the liquid in the troughs may be agitated to further prevent its separation, and for this purpose rock shafts 18 are journaled across the holding tank at intervals and are provided with depending arms 19 carrying perforated blades 20 which dip into the liquid in the troughs and are swung gently to and fro therein by means of cranks 21 on the ends of the rock shafts 18 which are connected by a connecting rod 22 having a pitman connection 23 with a crank disk 24 on a driving shaft 25 which is journaled at the end of the holding tank. By driving the shaft 25 from any suitable mechanism belted to the pulley 26 thereon, all of the rock shafts 18 are caused to oscillate and swing their blades 20 to agitate the liquid in the troughs and also to aerate it.

The partition 8 between the first trough and the one next thereto is somewhat higher than the others in order that the froth or foam which forms on the liquid may be retained thereon to act as a protection for the liquid against the cooling effect of the air, and this accumulated foam may be distributed by hand over the other troughs.

Preferably a thermometer 27 is conveniently arranged to indicate the temperature of the liquid in the holding tank so that the operator may know when it is desirable to introduce more heating fluid into the heating jacket or chamber formed between the metal walls of the troughs and the bottom of the tank 7.

In operation the liquid which is discharged from the pasteurizer 5 at a suitable pasteurizing temperature runs into one end of the first trough, through which it travels to the other end where it passes through the opening 13 and the tube 14 into the next trough and continues in its course through all of the troughs until it is finally discharged from the last trough of the holding tank into the trough 15 leading to the cooler. In traveling this sinuous course the liquid has been kept at a pasteurizing temperature and it has required a sufficient length of time between its discharge from the pasteurizer 5 and its admission to the cooler 6 to complete the thorough pasteurization thereof. Every particle of milk or other liquid treated has required the same time in its passage through the holding tank and this has been accomplished without settling or separation of the lighter parts from the heavier parts owing to the agitation produced by the blades 20 and to the combined effect of the openings 13 and the tubes 14 carrying a portion from the upper part of the trough and also a portion from the lower part of the trough.

What I claim as my invention is:

1. In a pasteurizing holding tank, a series of partitioned troughs adapted to receive heated liquid from a pasteurizer, there being communication between the troughs at alternate ends of the partitions and leading from different elevations of the troughs, whereby the liquid is caused to travel in a sinuous course and is prevented from separation.

2. In a pasteurizing holding tank, a series of partitioned troughs adapted to receive heated liquid from a pasteurizer, there being openings at alternate ends of the partitions near their upper edges, and tubes at the said ends of the partitions leading from the lower portion of one trough to the next trough, whereby the upper and the lower portions of the liquid in one trough are conducted to the next trough and the liquid is caused to travel in a sinuous course.

3. In a pasteurizing holding tank, a series of troughs formed of sheet metal bent to provide partitions between the troughs, a vat containing the troughs and forming a heating jacket therefor, and a heating pipe for leading heating fluid to the space between the troughs and the vat, there being communications between the troughs at alternate ends of the partitions whereby the liquid is caused to travel in a sinuous course through the successive troughs.

4. In a pasteurizing holding tank, a series of troughs separated by partitions and adapted to receive liquid at a pasteurizing temperature from a pasteurizer, there being communications between the troughs at alternate ends of the partitions, and means for agitating the liquid contained in the troughs.

5. In a pasteurizing holding tank, a series of troughs separated by partitions and adapted to receive liquid at a pasteurizing temperature from a pasteurizer, there being communications between the troughs at alternate ends of the partitions, rock shafts extending across the troughs, plates on the rock shafts extending into the troughs, and means for rocking the rock shafts to produce agitation of the liquid and prevent its separation.

6. In a pasteurizing holding tank, a vat, a series of troughs formed in the vat with partitions therebetween, said troughs being adapted to receive liquid at a pasteurizing temperature from a pasteurizer, there being communications between the troughs at alternate ends of the partitions, rock shafts journaled across the vat and provided with depending arms, perforated plates on the arms extending into the liquid in the troughs, crank arms on the rock shaft, a connecting rod connecting the crank arms, a drive shaft journaled on the vat, a crank disk carried thereby, and a pitman connecting the crank disk with the connecting rod.

7. A pasteurizing holding tank, comprising a series of troughs adapted to receive liquid at a pasteurizing temperature from a pasteurizer, there being communication between the troughs at alternate ends of the partitions, spouts leading from one end of each trough, a cooler, a trough leading thereto from the several spouts, and means for closing the spouts of all of the troughs except the last trough.

8. In a pasteurizing holding tank, a series of troughs having partitions therebetween and adapted to receive liquid at a pasteurizing temperature from a pasteurizer, there being communication between the troughs at alternate ends of the partitions, the partition between the last trough and the one next thereto being higher than the other partitions to retain the foam on the liquid and thereby protect it from the air.

9. In a pasteurizing holding tank, a vat, a series of troughs formed therein of sheet metal with partitions therebetween, there being openings at the alternate ends of the partitions near the upper edge thereof, tubes passing through the partitions at such ends and leading from the bottom part of the troughs, means for heating the space between the troughs and the vat, a spout leading from one end of each trough, a pasteurizer for discharging liquid at a pasteurizing temperature into the first trough, a cooler, a trough leading to the cooler from the several spouts, means for closing the spouts of the troughs, rock shafts journaled across the vat, perforated plates carried thereby and extending into the liquid of the troughs, cranks on the rock shafts, a connecting rod connecting the cranks, a driving shaft, a crank disk thereon, and a pitman connecting the crank disk with the connecting rod.

In testimony whereof, I affix my signature, in presence of two witnesses.

JOSEPH E. AMEND.

Witnesses:
R. S. C. CALDWELL,
JOHN GRAF.